US011979497B2

(12) United States Patent
Stein et al.

(10) Patent No.: US 11,979,497 B2
(45) Date of Patent: *May 7, 2024

(54) IDENTITY SYSTEMS, METHODS, AND MEDIA FOR AUDITING AND NOTIFYING USERS CONCERNING VERIFIABLE CLAIMS

(71) Applicant: Google LLC, Mountain View, CA (US)

(72) Inventors: David Stein, New York, NY (US); John Wittrock, Brooklyn, NY (US)

(73) Assignee: Google LLC, Mountain View, CA (US)

( * ) Notice: Subject to any disclaimer, the term of this patent is extended or adjusted under 35 U.S.C. 154(b) by 111 days.

This patent is subject to a terminal disclaimer.

(21) Appl. No.: 17/466,657

(22) Filed: Sep. 3, 2021

(65) Prior Publication Data

US 2021/0399888 A1 Dec. 23, 2021

Related U.S. Application Data

(63) Continuation of application No. 16/704,544, filed on Dec. 5, 2019, now Pat. No. 11,115,207.

(Continued)

(51) Int. Cl.
*H04L 9/08* (2006.01)
*H04L 9/32* (2006.01)

(52) U.S. Cl.
CPC .......... *H04L 9/0894* (2013.01); *H04L 9/0825* (2013.01); *H04L 9/321* (2013.01)

(58) Field of Classification Search
CPC ...... H04L 9/0894; H04L 9/0825; H04L 9/321

(Continued)

(56) References Cited

U.S. PATENT DOCUMENTS 5,276,737 A 1/1994 Micali
5,315,658 A 5/1994 Micali (Continued)

OTHER PUBLICATIONS

International Preliminary Report on Patentability dated Jun. 17, 2021 in International Patent Application No. PCT/US2019/064666, pp. 1-5.

(Continued)

*Primary Examiner* — Teshome Hailu
(74) *Attorney, Agent, or Firm* — Lerner David LLP

(57) ABSTRACT

Identity systems, methods, and media for auditing and notifying users concerning verifiable claims are provided. In some embodiments, the method comprises: prior to engaging with a verifier needing information held in escrow on behalf of a holder, receiving a request to store the information associated with the holder in escrow; causing a user interface to be presented, wherein the user interface allows the holder to select an escrow provider from a plurality of escrow providers for storing the information associated with the holder in escrow; transmitting the information to the selected escrow provider, wherein a public-private key pair for signing with the information associated with the holder is generated, wherein the public-private key pair includes a public key and a private key, wherein the private key and the information associated with the holder is distributed to the plurality of escrow providers, and wherein the public key is transmitted to an auditable ledger system; receiving from each of the plurality of escrow providers, an escrow identifier corresponding to a location where the information is stored in escrow to obtain a set of escrow identifiers; and transmitting the set of escrow identifiers to a verifier device for verifying a claim.

21 Claims, 9 Drawing Sheets

Related U.S. Application Data

(60) Provisional application No. 62/775,897, filed on Dec. 5, 2018.

(58) Field of Classification Search
USPC .......................................................... 713/155
See application file for complete search history.

(56) References Cited

U.S. PATENT DOCUMENTS

| | | | | | |
|---|---|---|---|---|---|
| 6,118,874 | A * | 9/2000 | Okamoto | H04L 9/0894 380/282 |
| 6,871,287 | B1 | 3/2005 | Ellingson | |
| 7,181,017 | B1 * | 2/2007 | Nagel | H04L 9/0841 380/282 |
| 7,869,591 | B1 * | 1/2011 | Nagel | H04L 63/061 380/282 |
| 8,316,237 | B1 * | 11/2012 | Felsher | H04L 9/3249 380/282 |
| 8,429,409 | B1 * | 4/2013 | Wall | H04M 15/48 713/172 |
| 9,419,951 | B1 * | 8/2016 | Felsher | H04L 9/0841 |
| 2008/0005030 | A1 * | 1/2008 | Schlarb | H04L 9/0894 705/57 |
| 2014/0281491 | A1 | 9/2014 | Zaverucha et al. | |
| 2018/0046823 | A1 * | 2/2018 | Durham | H04L 9/3236 |
| 2018/0225226 | A1 * | 8/2018 | Ford | H04L 9/0894 |
| 2018/0255037 | A1 | 9/2018 | Bender et al. | |
| 2019/0312857 | A1 * | 10/2019 | Lander | G06F 9/5072 |

OTHER PUBLICATIONS

International Search Report and Written Opinion dated Feb. 7, 2020 in International Patent Application No. PCT/US2019/064666, pp. 1-13.

Notice of Allowance dated May 11, 2021 in U.S. Appl. No. 16/704,544, pp. 2-4.

Office Action dated Sep. 29, 2020 in U.S. Appl. No. 16/704,544, pp. 2-8.

* cited by examiner

IDENTITY SYSTEMS, METHODS, AND MEDIA FOR AUDITING AND NOTIFYING USERS CONCERNING VERIFIABLE CLAIMS

CROSS-REFERENCE TO RELATED APPLICATIONS

This application is a continuation of U.S. patent application Ser. No. 16/704,544, filed Dec. 5, 2019, which claims the benefit of U.S. Provisional Patent Application No. 62/775,897, filed Dec. 5, 2018, each of which is hereby incorporated by reference herein in its entirety.

TECHNICAL FIELD

The disclosed subject matter relates to identity systems, methods, and media for auditing and notifying users concerning verifiable claims.

BACKGROUND

People frequently carry multiple forms of identification or multiple proofs of membership with them. For example, a person can carry a driver's license, which may be used for multiple purposes, such as to rent a car, to provide proof of age, etc. As another example, a person can carry multiple membership cards corresponding to different entities or businesses, such as a gym membership card, a discount card for a particular store, and/or any other suitable types of cards. It can, however, be cumbersome to carry so many different forms of identification. Additionally, in some cases, a particular aspect of a user identity may need to be verified (e.g., that a person is over the age of twenty-one years old, that a person's is greater than a voting age, etc.), but, when proving the particular aspect, that person may end up revealing additional identity information. For example, to provide a form of verification that a person is over the age of twenty-one years old, the person may present a driver's license, which may also reveal the person's address, the person's characteristics, the person's legal name, the person's organ donation option information, or other personal information. However, such individuals may desire to keep such identifying information private.

Some solutions include credentials that can encode user attributes in which a user can minimally disclose information about what attributes are encoded in a token in response to dynamic verifier policies. For example, a user may choose to only disclose a subset of the encoded attributes by providing that the user's undisclosed name does not appear on a blacklist and that the user's age is greater than a particular age without disclosing the user's birthdate. This can include having the user storing their identity physically on their person in a computing device such as a mobile device or smart card. Such solutions, however, run into problems when the user behaves in such a way that requires an approach that holds the user accountable for their behavior. For example, booking a meeting room at a community center generally should not require the user to provide access to full identity information and contact information, but there must be a way to follow up with the user if the meeting room is vandalized.

Accordingly, it is desirable to provide new identity systems, methods, and media for auditing and notifying users concerning verifiable claims.

SUMMARY

Identity systems, methods, and media for auditing and notifying users concerning verifiable claims are provided.

In accordance with some embodiments of the disclosed subject matter, a method for identity escrow is provided, the method comprising: prior to engaging with a verifier needing information held in escrow on behalf of a holder, receiving, using a hardware processor, a request to store the information associated with the holder in escrow; causing, using the hardware processor, a user interface to be presented, wherein the user interface allows the holder to select an escrow provider from a plurality of escrow providers for storing the information associated with the holder in escrow; transmitting, using the hardware processor, the information to the selected escrow provider, wherein a public-private key pair for signing with the information associated with the holder is generated, wherein the public-private key pair includes a public key and a private key, wherein the private key and the information associated with the holder is distributed to the plurality of escrow providers, and wherein the public key is transmitted to an auditable ledger system; receiving, using the hardware processor, from each of the plurality of escrow providers, an escrow identifier corresponding to a location where the information is stored in escrow to obtain a set of escrow identifiers; and transmitting, using the hardware processor, the set of escrow identifiers to a verifier device for verifying a claim.

In some embodiments, the method further comprises transmitting a request to access a service in which the verifier at the verifier device is accessing the information associated with the holder in escrow using the set of escrow identifiers.

In some embodiments, the information associated with the holder is received from an identity application executing on a computing device associated with the holder and wherein the identity application causes the user interface to be presented.

In some embodiments, the escrow identifier is received from an escrow provider in response to the escrow provider verifying the received information and wherein metadata indicating one or more fields in which the information is stored is received from the escrow provider.

In some embodiments, signed metadata and escrow key information associated with the escrow identifiers are transmitted to the verifier device. In some embodiments, the escrow key information includes a generation date and an expiration date.

In some embodiments, the method further comprises transmitting a query to the auditable ledger system to determine whether the set of escrow identifiers have been posted to a ledger of the auditable ledger system.

In some embodiments, the method further comprises receiving an alert that the verifier is accessing the information associated with the holder that is being held in escrow based on the transmitted query.

In accordance with some embodiments of the disclosed subject matter, a system for identity escrow is provided, the system comprising a hardware processor that is configured to: prior to engaging with a verifier needing information held in escrow on behalf of a holder, receive a request to store the information associated with the holder in escrow; cause a user interface to be presented, wherein the user interface allows the holder to select an escrow provider from a plurality of escrow providers for storing the information associated with the holder in escrow; transmit the information to the selected escrow provider, wherein a public-private key pair for signing with the information associated with the holder is generated, wherein the public-private key pair includes a public key and a private key, wherein the private key and the information associated with the holder is distributed to the plurality of escrow providers, and wherein the public key is transmitted to an auditable ledger system; receive, from each of the plurality of escrow providers, an escrow identifier corresponding to a location where the information is stored in escrow to obtain a set of escrow identifiers; and transmit the set of escrow identifiers to a verifier device for verifying a claim.

In accordance with some embodiments of the disclosed subject matter, a non-transitory computer-readable medium containing computer executable instructions that, when executed by a processor, cause the processor to perform a method for identity escrow is provided, the method comprising: prior to engaging with a verifier needing information held in escrow on behalf of a holder, receiving a request to store the information associated with the holder in escrow; causing a user interface to be presented, wherein the user interface allows the holder to select an escrow provider from a plurality of escrow providers for storing the information associated with the holder in escrow; transmitting the information to the selected escrow provider, wherein a public-private key pair for signing with the information associated with the holder is generated, wherein the public-private key pair includes a public key and a private key, wherein the private key and the information associated with the holder is distributed to the plurality of escrow providers, and wherein the public key is transmitted to an auditable ledger system; receiving from each of the plurality of escrow providers, an escrow identifier corresponding to a location where the information is stored in escrow to obtain a set of escrow identifiers; and transmitting the set of escrow identifiers to a verifier device for verifying a claim.

In accordance with some embodiments of the disclosed subject matter, a system for identity escrow is provided, the system comprising: prior to engaging with a verifier needing information held in escrow on behalf of a holder, means for receiving a request to store the information associated with the holder in escrow; means for causing a user interface to be presented, wherein the user interface allows the holder to select an escrow provider from a plurality of escrow providers for storing the information associated with the holder in escrow; means for transmitting the information to the selected escrow provider, wherein a public-private key pair for signing with the information associated with the holder is generated, wherein the public-private key pair includes a public key and a private key, wherein the private key and the information associated with the holder is distributed to the plurality of escrow providers, and wherein the public key is transmitted to an auditable ledger system; means for receiving from each of the plurality of escrow providers, an escrow identifier corresponding to a location where the information is stored in escrow to obtain a set of escrow identifiers; and means for transmitting the set of escrow identifiers to a verifier device for verifying a claim.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
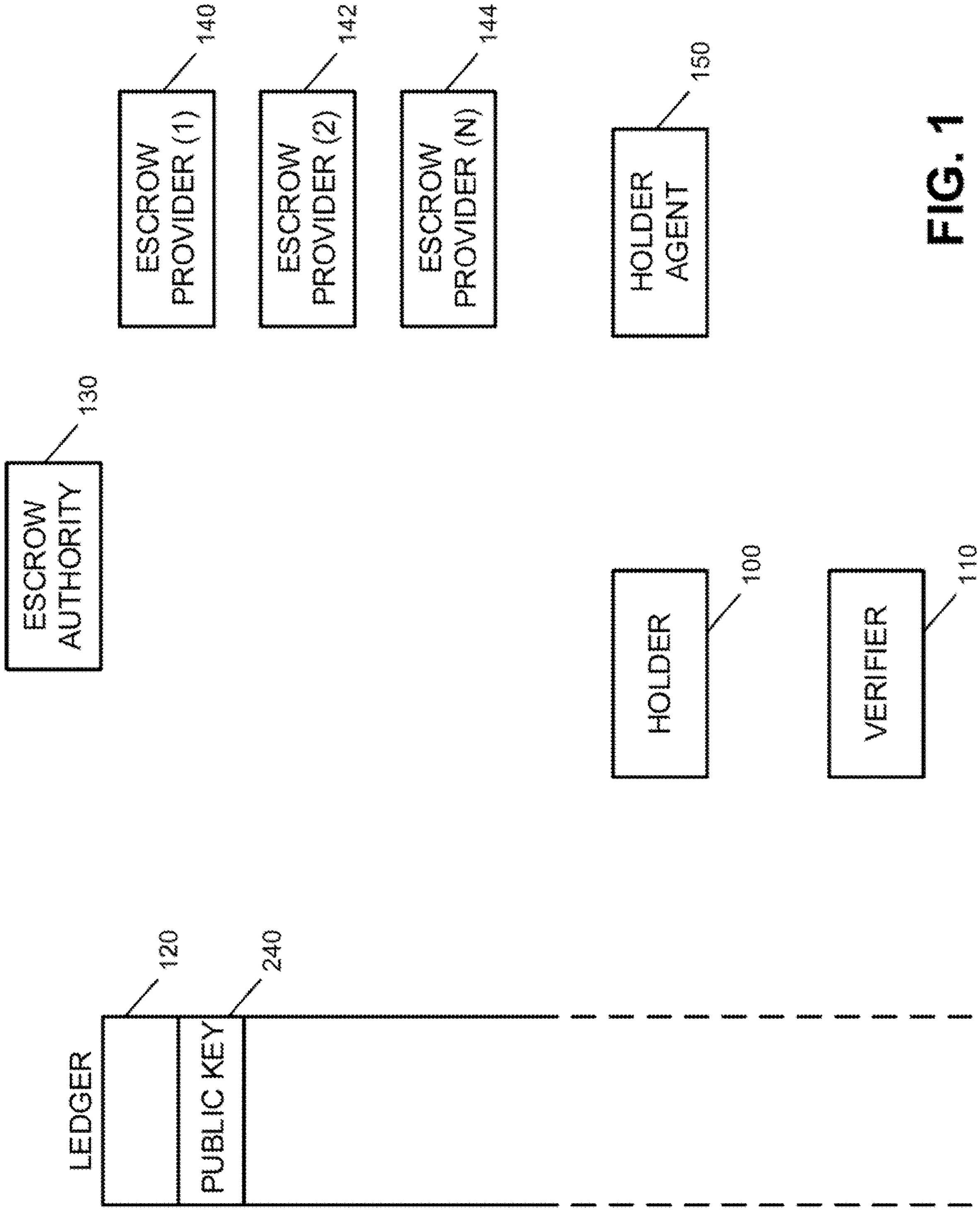
FIGS. 1-7 show schematic diagrams of interactions between a ledger, an escrow authority, an escrow provider, a holder, a holder agent, and a verifier in accordance with some embodiments of the disclosed subject matter.

In accordance with various embodiments, mechanisms (which can include methods, systems, and media) for auditing and notifying users concerning verifiable claims are provided. More particularly, the disclosed subject matter relates to identity systems for holding identity information in escrow such that it cannot be accessed without a user associated with the identity information from being notified.

Verifiable Claims

In some embodiments, the disclosed subject matter can include features relating to verifiable claims.

As used herein, a verifiable claim generally refers to data that can be used to demonstrate a property signed by an authority. For example, a province or state entity can assert that an individual is over the age of 25 years of age and can drive a motor vehicle. In continuing this example, the individual can use this claim to rent a vehicle from a rental agency.

As used herein, an issuer generally refers to an authority or any other suitable entity that issues a verifiable claim. For example, as used in the above-mentioned example, an issuer can be the province or state entity (e.g., the province of Ontario, the state of New York, etc.).

It should be noted that, in some embodiments, an issuing device can be associated with any suitable organization or entity. For example, in some embodiments, the issuing device can be associated with a government (e.g., a local government, a national government, and/or any other suitable type of government). In some such embodiments, the issuing device can issue user credentials related to authorizations given by the government and/or information stipulated by the government. As another example, in some embodiments, the issuing device can be associated with an organization associated with a building the user of the user device lives in. In some such embodiments, the issuing device can issue user credentials related to authorizations given by management of the building, such as locations within the building the user is allowed to access, and/or any other suitable type of user credentials.

As used herein, a holder generally refers to an entity that carries a verifiable claim. For example, as used in the above-mentioned example, a holder can be the individual (e.g., Person A). An illustrative holder device 100 is shown in FIGS. 1-7.

As used herein, a verifier generally refers to an entity that confirms an identity. For example, as used in the above-mentioned example, a verifier can be the rental agency that rents vehicles to individuals. An illustrative verifier device 110 is shown in FIGS. 1-7.

It should be noted that, although the embodiments described herein generally refer to identifying information, any suitable information can be stored in escrow, such as different types of identifying information (e.g., a name of a user, a birthdate of a user, an address of the user, a citizenship of a user, and/or any other suitable identifying information), information indicating activities that a user is authorized to perform (e.g., drive, borrow books from a particular library, and/or any other suitable activities), user accounts associated with different businesses or services (e.g., a bank account, an account associated with a vehicle sharing service, a gym membership, and/or any other suitable types of accounts), and/or any other suitable type of information.

Ledger

In some embodiments, the disclosed subject matter can include an auditable ledger. The auditable ledger can be any suitable type of log or ledger used for recording or storing attributes associated with users, such as a user of a user device. It should be noted that the auditable ledger is generally an append-only, publicly visible ledger. For example, a blockchain ledger is an example of an auditable, append-only, publicly visible ledger that can be implemented in connection with the disclosed subject matter.

An illustrative ledger 120 is shown in FIGS. 1-7.

Escrow

In some embodiments, the disclosed subject matter can include an escrow system.

As used herein, an escrow authority generally refers to a centralized entity that can confirm the behavior of an escrow provider. An illustrative escrow authority 130 is shown in FIGS. 1-7.

As used herein, an escrow provider generally refers to one or more escrow providers that have been vetted by the escrow authority to hold data in escrow on behalf of a holder. For example, FIGS. 1-7 shows that an illustrative escrow system can include multiple illustrative escrow providers (e.g., escrow provider (1), escrow provider (2), . . . escrow provider (N)). It should be noted that this is merely illustrative and that any suitable number of escrow providers, including only one escrow provider, can be included in the escrow system. Any suitable number of escrow providers can be vetted or otherwise vouched for by an escrow authority (e.g., one, two, ten, etc.). Each escrow authority can have a different number of associated escrow providers for holding data in escrow on behalf of a holder.

As used herein, a holder agent generally refers to a service (which may be implemented and maintained by the holder or an external provider) that monitors the ledger on behalf of the holder. An illustrative holder agent 150 is shown in FIGS. 1-7.

Illustrative Embodiments

Before engaging with a verifier that requires information held in escrow (e.g., a determination of whether an individual is over the age of 21), the holder can place that information into escrow using the escrow system. In order to do this, one or more trusted escrow providers can be established in which the data is passed into those escrows.

Figure 2:
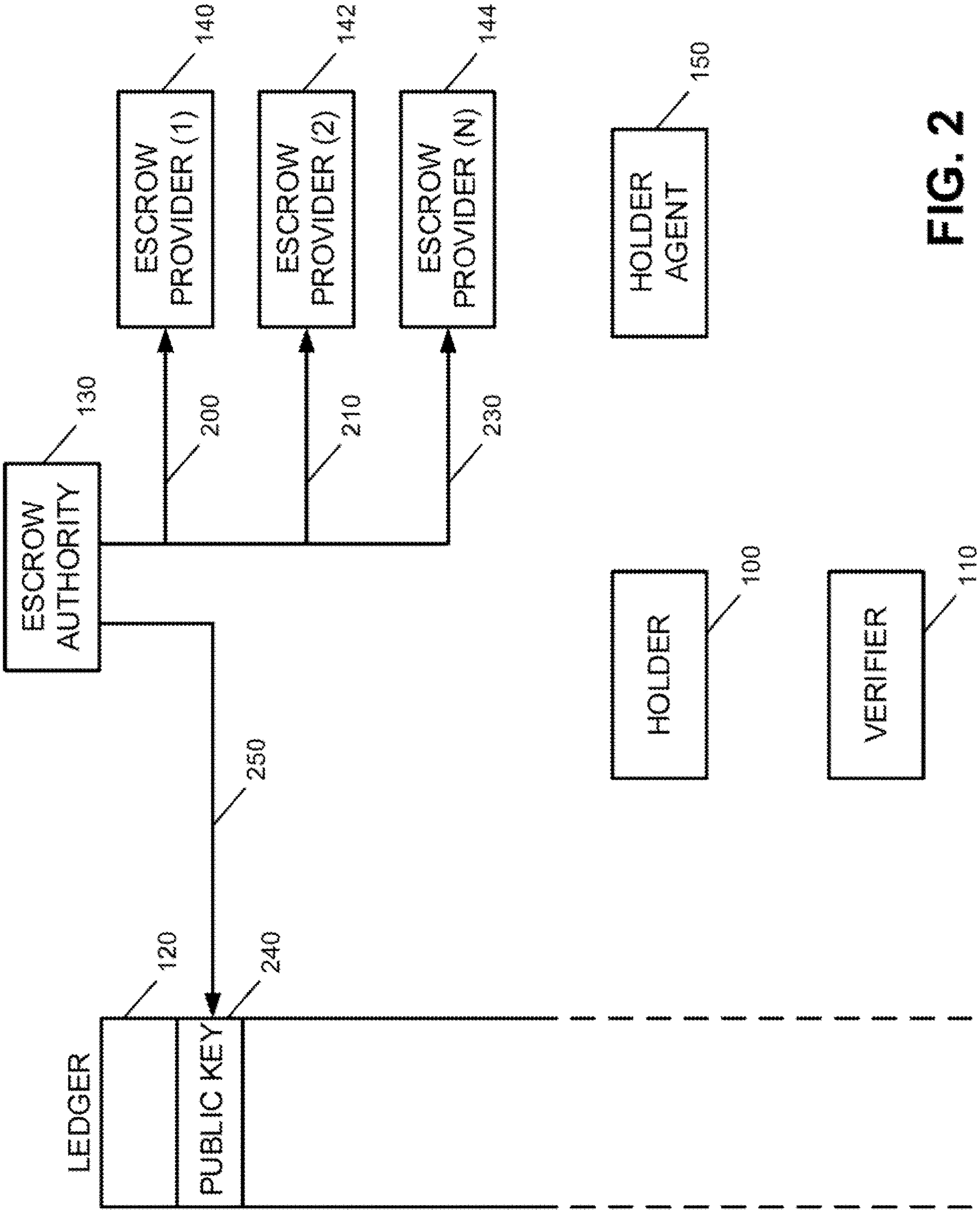

It should be noted that each escrow provider in a set of one or more escrow providers can sign data using the same public-private key pair. Generally speaking, to do this, each escrow provider in the set of one or more escrow providers can generate a public-private key pair and can distribute the private key to each of the other escrow providers in the set of one or more escrow providers. For example, as shown in FIG. 2 having multiple escrow providers, escrow authority 130 can generate a public-private key pair and transmit the generated private key to each escrow provider in a particular set of one or more escrow providers. In a more particular example, escrow authority 130 can transmit the generated private key to an associated escrow provider. In another more particular example, as shown in FIG. 2, escrow authority 130 can transmit the generated private key to multiple escrow providers—e.g., escrow provider (1) 140 at 200, escrow provider (2) 142 at 210, and/or all escrow providers 144 at 230. In addition, as shown in FIG. 2, escrow authority 130 can transmit a public key 240 for storage in auditable ledger 120 at 250. It should be noted that escrow authority 130 can post a signed copy of the public key 240 to the ledger 120 along with any other suitable key information associated with the public key 240, such as a generation date and an expiration date.

In some embodiments, when a holder, such as holder device 100, wants to place data into escrow, a holder device 100 can select a set of one or more authorized escrow providers. For example, a holder device 100 can select a single escrow provider for storing data in escrow. In another example, as shown in FIG. 2, a holder device 100 can select multiple escrow providers, such as escrow provider (1) 140, escrow provider (2) 142, and/or all escrow providers 144. It should be noted that although FIGS. 1-7 show three escrow providers, this is merely illustrative and any suitable number of escrow providers that have been vetted, assessed, and otherwise authorized by an escrow authority to hold data in escrow on behalf of a holder can be provided (e.g., including a single escrow provider).

In some embodiments, when a holder, such as holder device 100, wants to place data into escrow, a holder device 100 can launch an identity application on the holder device and, within the identity application, can be presented with an interface for selecting one or more escrow providers (e.g., one or more of escrow provider (1) 140, escrow provider (2) 142, and/or all escrow providers 144) and providing the information for storage in escrow. Alternatively, in some embodiments, a holder device 100 can select an escrow authority that, in turn, selects the one or more escrow providers that have been vetted, assessed, and otherwise authorized by the escrow authority to hold data in escrow on behalf of a holder. In some embodiments, the user interface presented by the identity application can provide a set of fields for providing information that is to be stored in escrow.

In some embodiments, the escrow provider can confirm or verify the received information, can store a copy of the received information, and can transmit metadata about the field and an escrow identifier corresponding to where the received information is stored in escrow. It should be noted that the escrow identifier can be a unique, cryptographically random identifier. It should also be noted that the escrow provider does not store or observe any information other than the data stored in the field.

Figure 3:
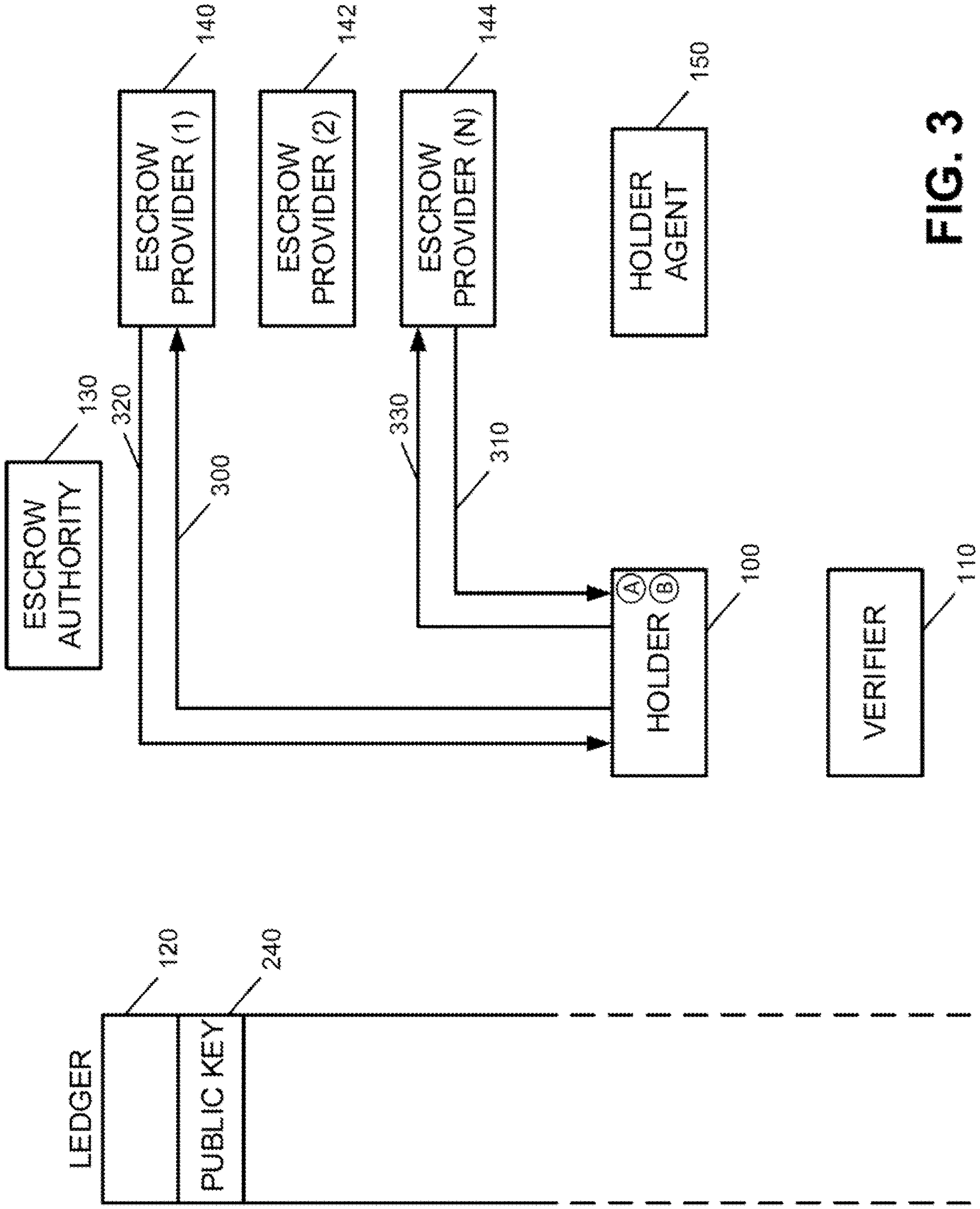

In a more particular example, as shown in FIG. 3, in response to receiving the data at 300 and 310 (e.g., where escrow provider (1) receives the data for storing in escrow at 300 and/or all escrow providers receive the data for storing in escrow at 310), each escrow provider can confirm or verify the received information in the same way a verifier, such as verifier 110, confirms or verifies the received information. In continuing this example, each escrow provider can store a copy of the received data and transmit metadata about the field and an escrow identifier corresponding to where the received information is stored in escrow. For example, an escrow provider can store a copy of the received data and transmit metadata about the field in which it is stored and an escrow identifier corresponding to where the received information is stored in escrow. In another example, as shown in FIG. 3, a first escrow provider 140 can transmit an escrow ID (A) at 320 and/or a second escrow provider 144 can transmit an escrow ID (B) at 330.

Figure 4:
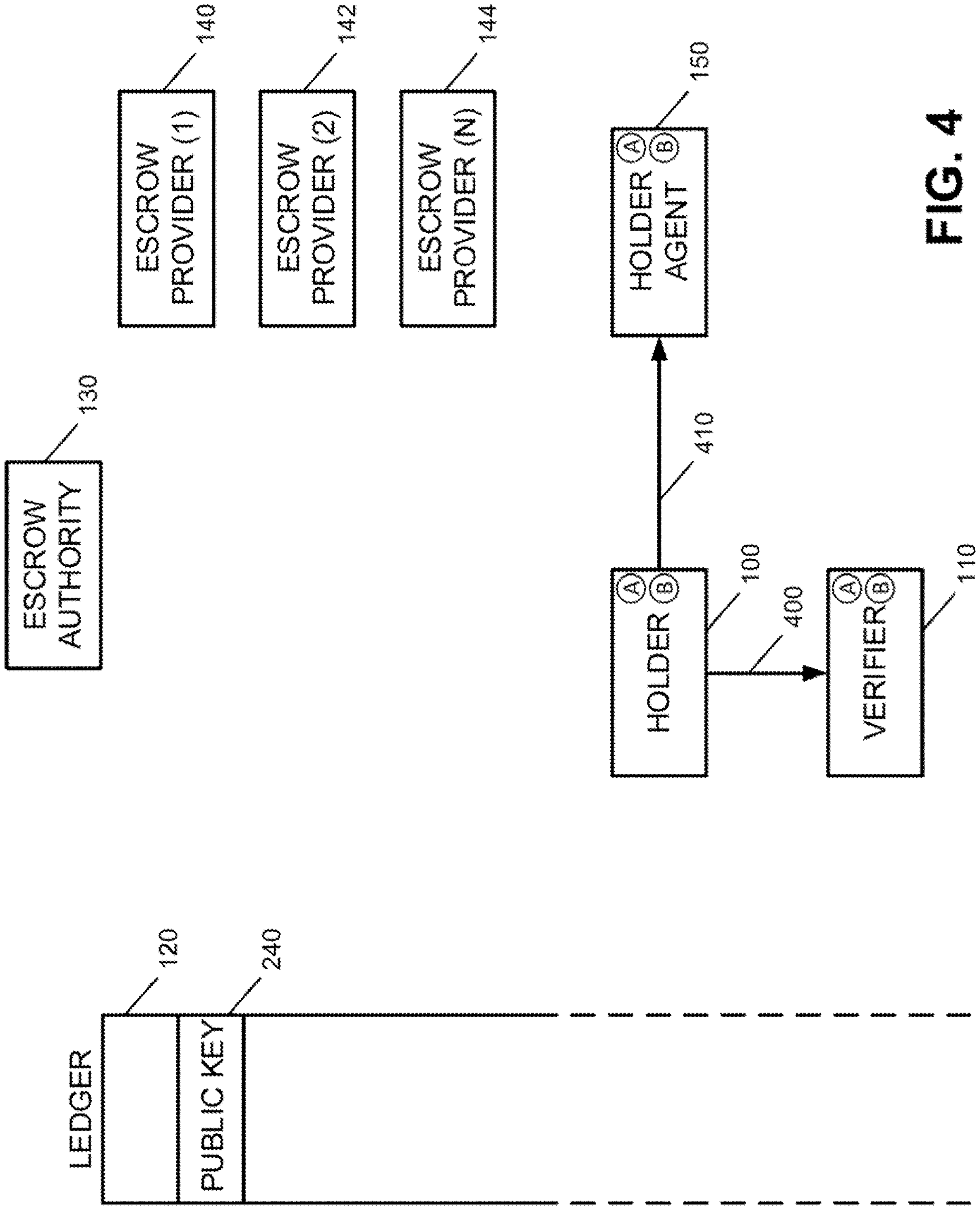

Turning to FIG. 4, once a holder, such as holder device 100, has placed data into escrow, holder 100 can use its set of escrow identifiers (e.g., escrow ID (A) and escrow ID (B)) to provide verifiers, such as verifier 110, with data in escrow. To do this, as shown in FIG. 4, holder device 100 can transmit the signed metadata and escrow key information associated with escrow ID (A) and/or escrow ID (B) to verifier 110 at 400. For example, the verifier 110 can then store the set of escrow identifiers and any other suitable escrow key information and the signed metadata and associate the escrow key information and the signed metadata with a current transaction corresponding to holder device 100.

In some embodiments, as also shown in FIG. 4, holder device 100 can also transmit the signed metadata and escrow key information associated with escrow ID (A) and/or escrow ID (B) to a holder agent 150 at 410. As described above, a holder agent generally refers to a service (which may be implemented and maintained by the holder or an external provider) that monitors the ledger on behalf of the holder.

Figure 5:
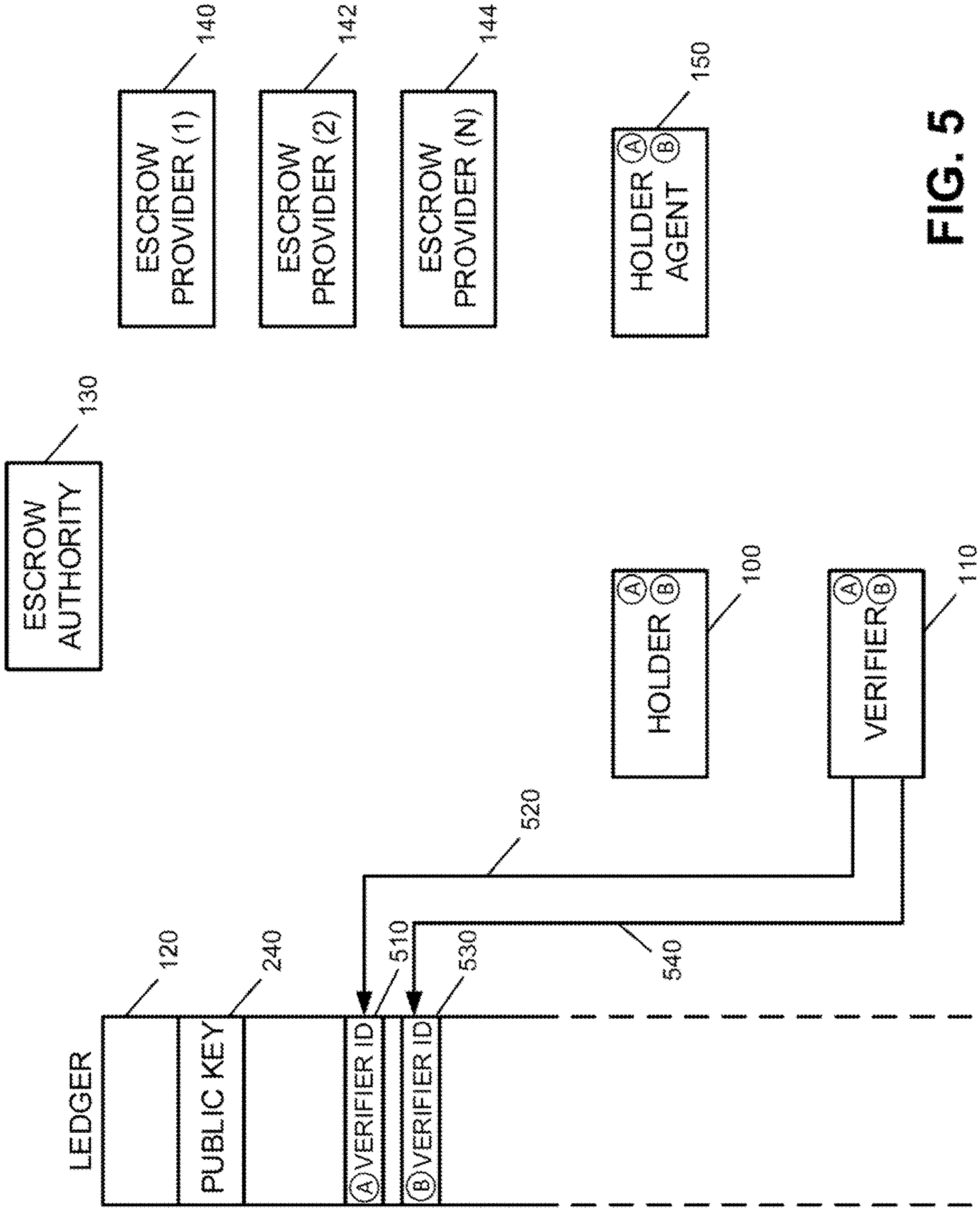
Figure 6:
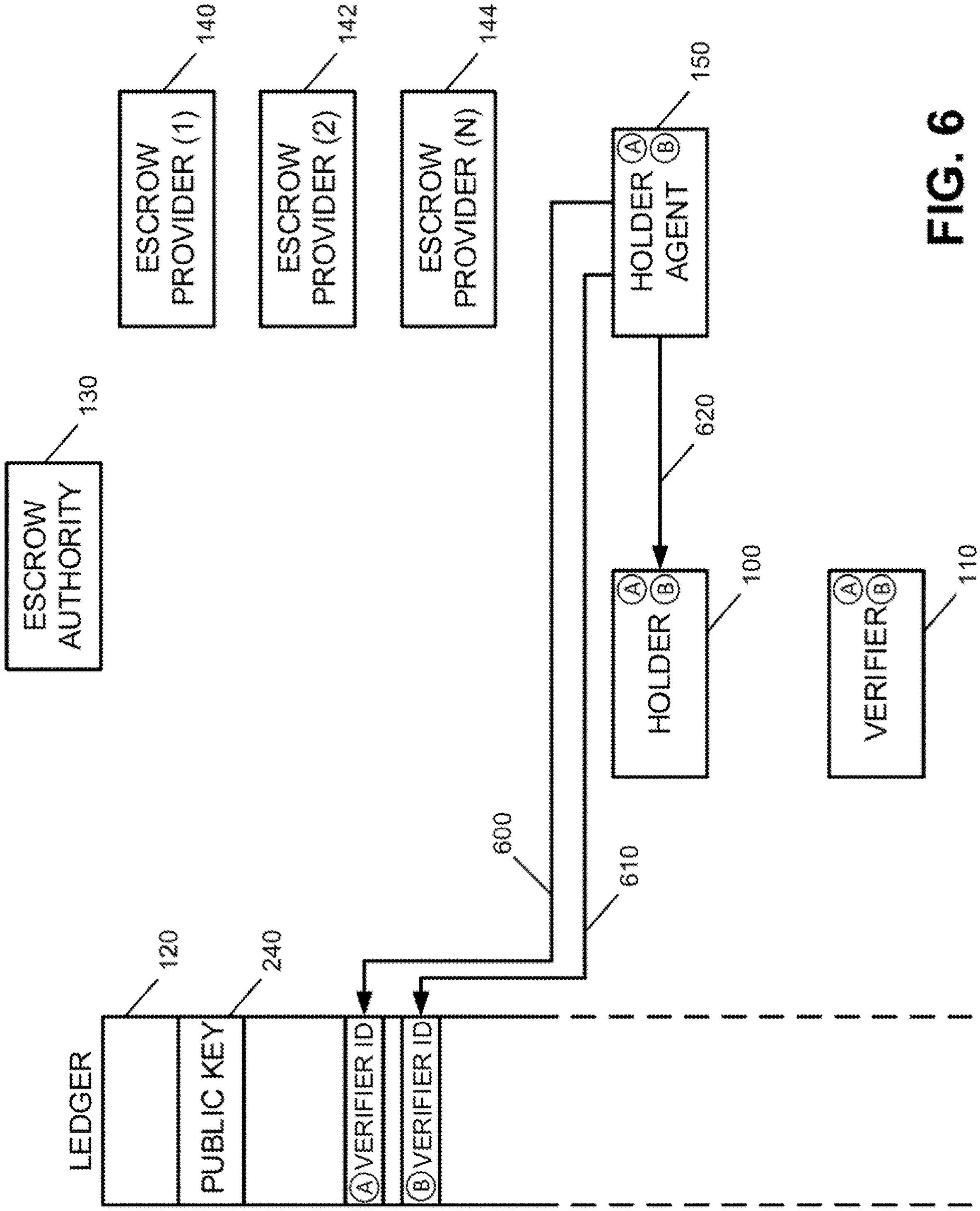

Turning to FIGS. 5 and 6, a verifier, such as verifier 110, may need to access the data that is being held in escrow. For example, verifier 110 may need to access the data that is being held in escrow in response to holder device 100 requesting access to any suitable service. For example, in some embodiments, the service can correspond to physical access to a particular building or area, such as a room in a building, access to a library, access to a gym, and/or any other suitable type of building or area. As another example, in some embodiments, the service can correspond to renting or borrowing equipment, such as renting or borrowing a vehicle, renting or borrowing of media content (e.g., a movie, a book, and/or any other suitable type of media content), and/or any other suitable type of item or equipment.

In some embodiments, holder device 100 can request access to the service from a verifier 110 that provides access to the service. For example, in instances where the service corresponds to physical access to a building or an area of a building, verifier device 110 can be a smart lock or any other suitable type of access security device that verifies that the user of the holder device 100 is authorized to access the building or the area of the building prior to unlocking an associated door, opening an associated gate, etc. As another example, in instances where the service corresponds to renting or borrowing an item, verifier device 110 can correspond to a device operating in a kiosk (e.g., a self-checkout computer at a library, a kiosk at a bike share, and/or any other suitable type of device) that verifies that the user of the holder device 100 is authorized to rent or borrow the item and performs any suitable functions associated with renting or borrowing the item (e.g., charging the user a fee, indicating that the item has been rented or borrowed on a particular date, and/or any other suitable functions).

In some embodiments, the holder device 100 can request access to the service in any suitable manner. For example, in some embodiments, the holder device 100 can request access to the service via an application executing on the user device that is associated with the verifier 110. Note that, in some embodiments, access to the service can be requested in any other suitable manner not involving the holder device 100 (e.g., via a display associated with the verifier device 110, by pushing a button associated with the verifier device 110, and/or in any other suitable manner).

In order to access the data, verifier 110 can add an entry to ledger 120 with contact information corresponding to verifier 110. In a more particular example, a webhook can be a webhook or any other suitable verifier-defined HTTP callback, such as an HTTP POST that occurs when verifier 110 determines that it needs to access the data that is being held in escrow. It should be noted that the webhook is a public request to access the data that is associated with a particular escrow identifier. For example, verifier 110 can add an entry 510 to ledger 120 using a verifier identifier and an escrow identifier. In another example, as shown in FIG. 5, verifier 110 can add an entry 510 to ledger 120 using a verifier identifier and escrow ID (A) at 520 and verifier 110 can also add an entry 530 to ledger 120 using the verifier identifier and escrow ID (B) at 540. As also shown in FIG. 5, verifier 110 can post multiple escrow identifiers to access multiple data fields.

It should also be noted that, as the escrow identifier is cryptographically random, no information relating to the holder (e.g., holder device 100) is exposed.

As shown in FIG. 6, at this point, holder agent 150 can determine that one or more escrow identifiers are included on its escrow identifier list (e.g., an escrow identifier, such as escrow ID (A) and/or escrow ID (B)) and can determine that one or more of the escrow identifiers on its escrow identifier list have been posted to ledger 120 that holder agent 150 is monitoring. For example, holder agent 150 can determine that an escrow identifier has been posted to ledger 120. In another example, at 600 of FIG. 6, holder agent 150 can determine that escrow ID (A) has been posted to ledger 120 and, at 610, holder agent 150 can determine that escrow ID (B) has been posted to ledger 120. In a more particular example, holder agent 150 can transmit a query to auditable ledger 120 to determine whether any one of the escrow identifiers on its escrow identifier list of one or more escrow identifiers have been posted to the ledger 120. In continuing this example, auditable ledger 120 can transmit a response to the query that indicates escrow ID (A) and/or escrow ID (B) from its escrow identifier list have been posted to the ledger 120 along with any other suitable information relating to the entries in ledger 120.

In response to these determinations, holder agent 150 can transmit an alert to holder 100 that verifier 110 is accessing data that is being held in escrow at ledger 120. For example, the alert can be presented on holder device 100 using any suitable approach (e.g., a push notification, a notification within the identity application, etc.).

Figure 7:
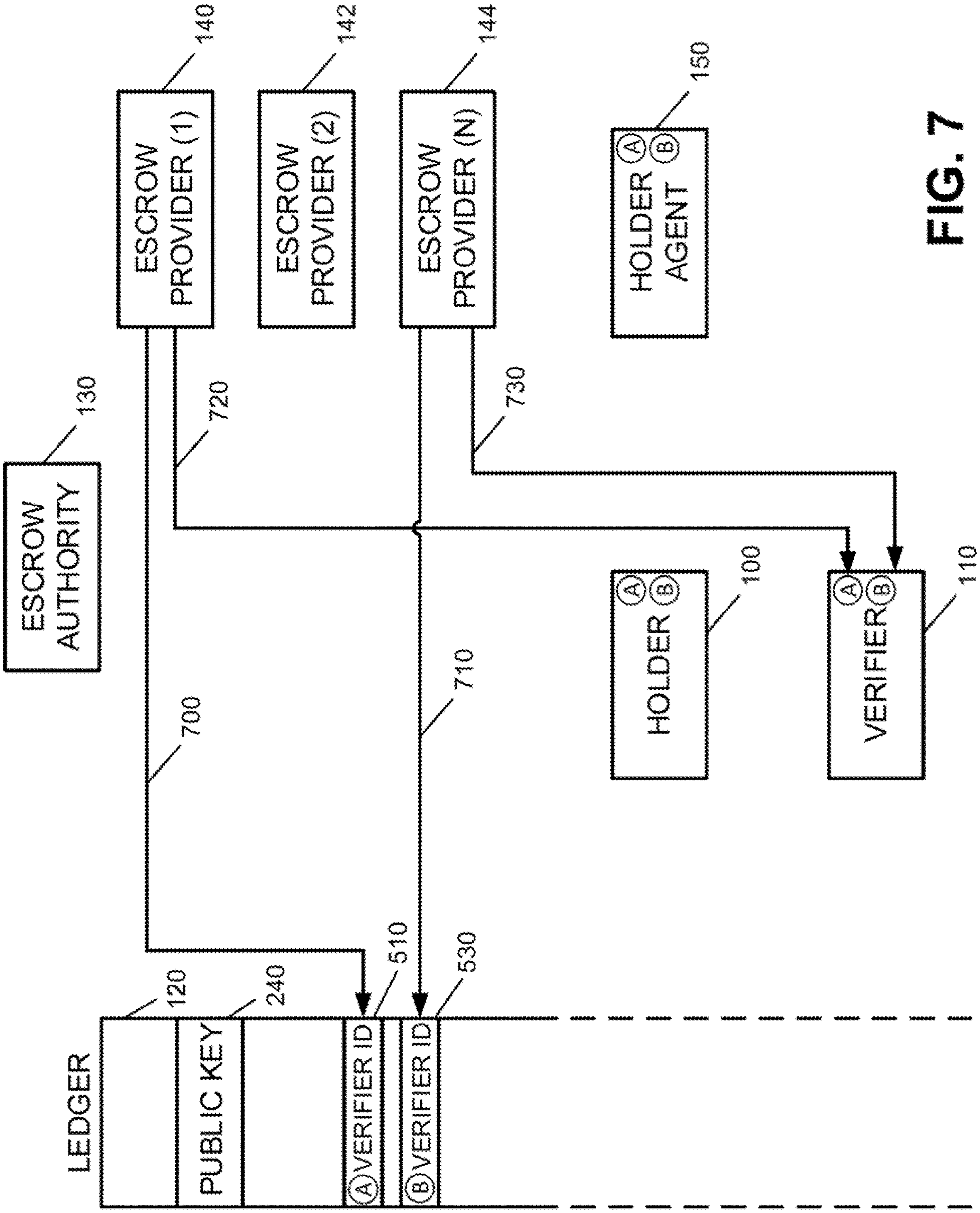

Turning to FIG. 7, in response to the one or more entries to ledger 120 by verifier 110 (e.g., entries 510 and 530), an escrow provider can determine that its associated escrow identifier has been posted to ledger 120. For example, escrow provider (1) 140 can determine, at 700, that escrow ID (A) has been posted to ledger 120 and escrow provider (N) 144 can determine, at 710, that escrow ID (B) has been posted to ledger 120. In a more particular example, each escrow provider can transmit a query to auditable ledger 120 to determine whether its corresponding escrow identifier has been posted to the ledger 120. In continuing this example, for escrow provider (1), auditable ledger 120 can transmit a response to the query that indicates escrow ID (A) has been posted to the ledger 120 along with any other suitable information relating to the entries in ledger 120.

In response, an escrow provider can use the callback information provided in the webhook of an entry in the ledger, such as entry 510 of ledger 120, to transmit the data being held in escrow to a verifier. For example, as shown in FIG. 7, escrow provider (1) 140 can use the callback information provided in the webhook of entry 510 to transmit the data being held in escrow to verifier 110. In another example, as also shown in FIG. 7, escrow provider (N) 144 can use the callback information provided in the webhook of entry 530 to transmit the data being held in escrow to verifier 110. In a more particular example, an escrow provider can transmit user credentials that indicate identity information about the user (e.g., a name of the user, a birthdate of the user, an address of the user, and/or any other suitable type of information), user credentials that indicate activities that the user is authorized to do (e.g., drive a car, vote, and/or any other suitable activity), and/or any other suitable type of information that was being held in escrow at ledger 120.

System Overview

Figure 8:
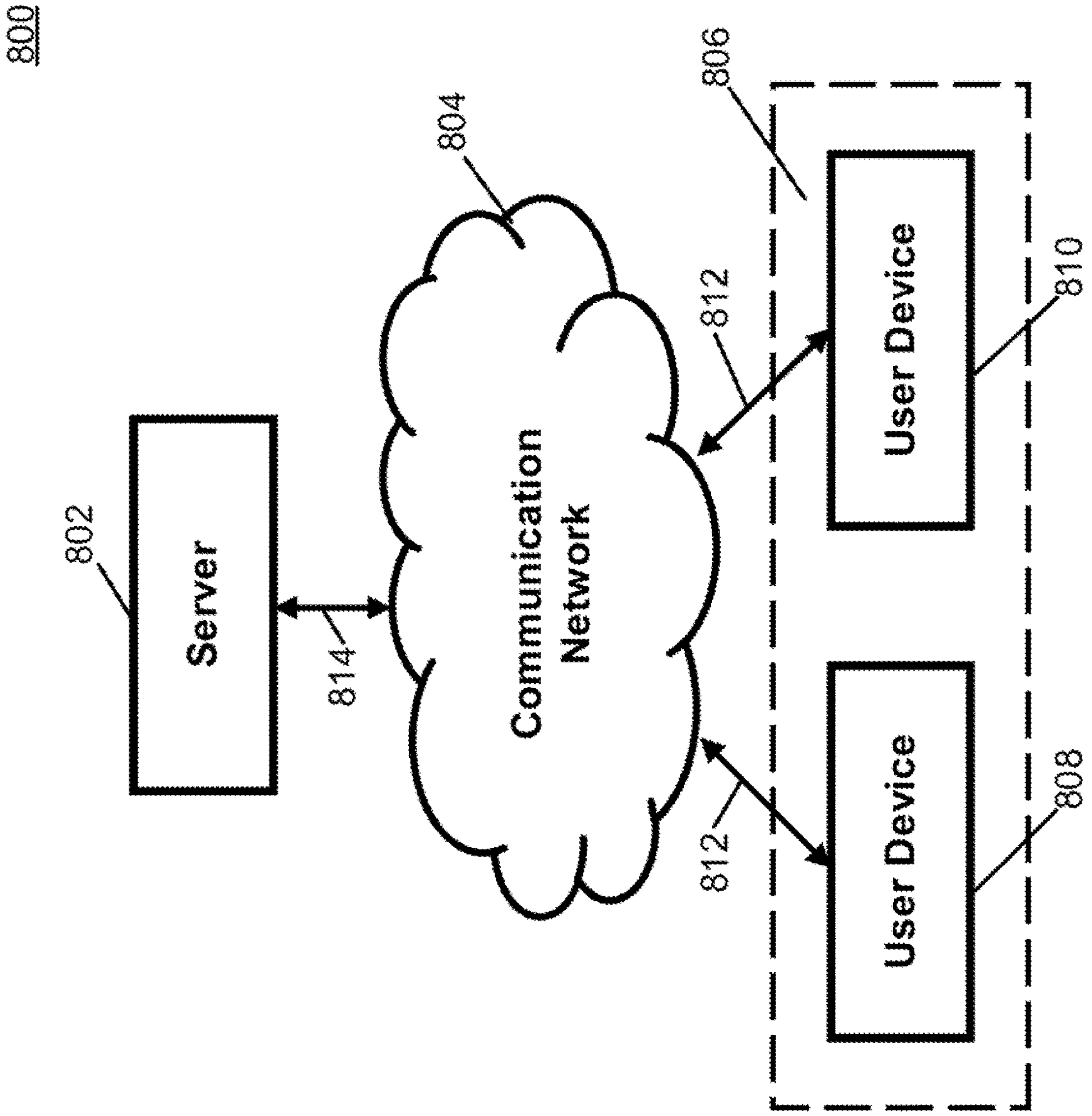
FIG. 8 shows a schematic diagram of an illustrative system suitable for implementation of mechanisms described herein for auditing and notifying users concerning verifiable claims in accordance with some embodiments of the disclosed subject matter.

Turning to FIG. 8, an illustrative example 800 of hardware for auditing and notifying users concerning verifiable claims that can be used in accordance with some embodiments of the disclosed subject matter is shown. As illustrated, hardware 800 can include a server 802, a communication network 804, and/or one or more user devices 806, such as user devices 808 and 810.

Server 802 can be any suitable server(s) for storing information, data, programs, and/or any other suitable type of content. In some embodiments, as described above in more detail in connection with FIGS. 1-7, server 802 can be multiple servers for storing, auditing, and notifying users concerning verifiable claims. For example, a server associated with an issuer can generate and transmit, to a holder device, a verifiable claim or any other suitable data that can be used to demonstrate a property signed by an authority (e.g., a municipality, a state agency, etc.). In another example, a server associated with a verifier can confirm an identity or any other suitable identifying information. In yet another example, one or more escrow servers can include an escrow authority that can confirm and vouch for the behavior of one or more escrow providers. In a further example, a holder agent server can monitor an auditable ledger on behalf of one or more holder devices. In another further example, a ledger server can provide an auditable, append-only, publicly visible ledger, such as a blockchain ledger.

Communication network 804 can be any suitable combination of one or more wired and/or wireless networks in some embodiments. For example, communication network 804 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 806 can be connected by one or more communications links (e.g., communications links 812) to communication network 804 that can be linked via one or more communications links (e.g., communications links 814) to server 802. The communications links can be any communications links suitable for communicating data among user devices 806 and server 802 such as network links, dial-up links, wireless links, hard-wired links, any other suitable communications links, or any suitable combination of such links.

User devices 806 can include any one or more user devices suitable for carrying a verifiable claim and/or requesting that data is stored in an auditable ledger. For example, in some embodiments, user devices 806, such as holder device 100, can receive a selection of a set of one or more authorized escrow providers and a set of fields that the holder device 100 would like to be held in escrow, and/or perform any other suitable functions. In some embodiments, user devices 806 can include any suitable types of devices. For example, in some embodiments, user devices 806 can include a mobile phone, a tablet computer, a wearable computer, a desktop computer, a laptop computer, television, speakers, a media player, a vehicle entertainment system, and/or any other suitable type of user device.

Although server 802 is illustrated as one device, the functions performed by server 802 can be performed using any suitable number of devices in some embodiments. For example, in some embodiments, multiple devices can be used to implement the functions performed by server 802.

Although two user devices 808 and 810 are shown in FIG. 8 to avoid over-complicating the figure, any suitable number of user devices, and/or any suitable types of user devices, can be used in some embodiments.

Figure 9:
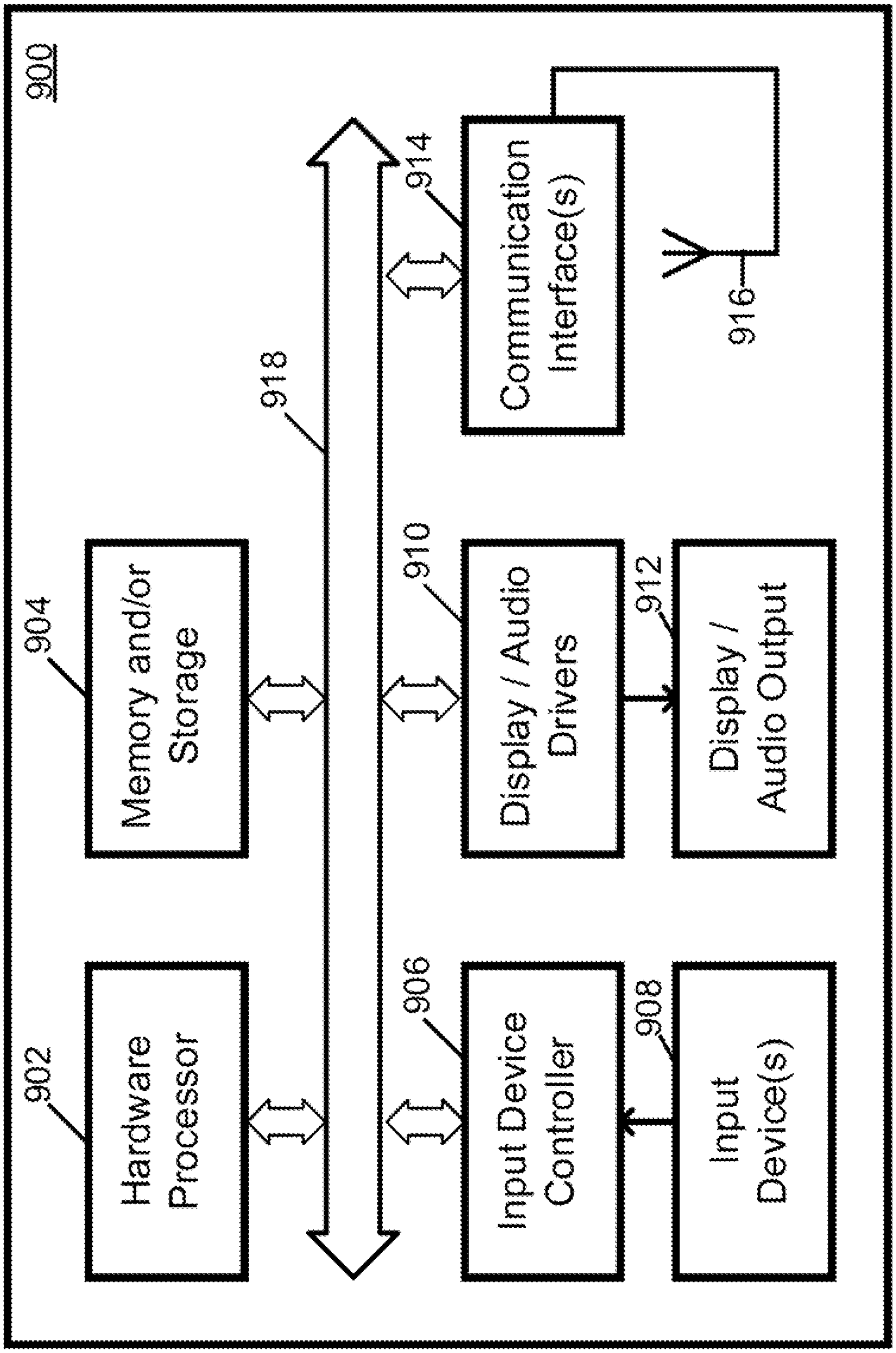
FIG. 9 shows a detailed example of hardware that can be used in a server and/or a user device of FIG. 8 in accordance with some embodiments of the disclosed subject matter.

Server 802 and user devices 806 can be implemented using any suitable hardware in some embodiments. For example, in some embodiments, devices 802 and 806 can be implemented using any suitable general-purpose computer or special-purpose computer. For example, a mobile phone may be implemented using a special-purpose computer. Any such general-purpose computer or special-purpose computer can include any suitable hardware. For example, as illustrated in example hardware 900 of FIG. 9, such hardware can include hardware processor 902, memory and/or storage 904, an input device controller 906, an input device 908, display/audio drivers 910, display and audio output circuitry 912, communication interface(s) 914, an antenna 916, and a bus 918.

Hardware processor 902 can include any suitable hardware processor, such as a microprocessor, a micro-controller, digital signal processor(s), dedicated logic, and/or any other suitable circuitry for controlling the functioning of a general-purpose computer or a special-purpose computer in some embodiments. In some embodiments, hardware processor 902 can be controlled by a server program stored in memory and/or storage of a server, such as server 902. For example, in some embodiments, the server program can cause hardware processor 902 to generate a public-private key pair, distribute the private key to each of the other escrow providers in a set of escrow providers, and transmit a public key for storage in an auditable ledger 120. In another example, in some embodiments, the server program can cause hardware processor 902 to confirm or verify the received data, can store a copy of the received data, and transmit metadata about the field and an escrow identifier (e.g., a unique, cryptographically random identifier) corresponding to where the received information is stored in escrow. In yet another example, in some embodiments, the server program can cause hardware processor 902 to add an entry to the auditable ledger with contact information corresponding to verifier in response to a verifier needing to access data stored in escrow. In a further example, in some embodiments, the server program can cause hardware processor 902 to monitor an auditable ledger on behalf of one or more holder devices and transmit an alert to a holder device that a verifier is accessing data that is being held in escrow at the auditable ledger. In another further example, in some embodiments, the server program can cause hardware process 902 to use the callback information provided in the webhook of an entry in the auditable ledger to transmit the data being held in escrow to a verifier.

Memory and/or storage 904 can be any suitable memory and/or storage for storing programs, data, and/or any other suitable information in some embodiments. For example, memory and/or storage 904 can include random access memory, read-only memory, flash memory, hard disk storage, optical media, and/or any other suitable memory.

Input device controller 906 can be any suitable circuitry for controlling and receiving input from one or more input devices 908 in some embodiments. For example, input device controller 906 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 910 can be any suitable circuitry for controlling and driving output to one or more display/audio output devices 912 in some embodiments. For example, display/audio drivers 910 can be circuitry for driving a touchscreen, a flat-panel display, a cathode ray tube display, a projector, a speaker or speakers, and/or any other suitable display and/or presentation devices.

Communication interface(s) 914 can be any suitable circuitry for interfacing with one or more communication networks (e.g., computer network 804). For example, interface(s) 914 can include network interface card circuitry, wireless communication circuitry, and/or any other suitable type of communication network circuitry.

Antenna 916 can be any suitable one or more antennas for wirelessly communicating with a communication network (e.g., communication network 804) in some embodiments. In some embodiments, antenna 916 can be omitted.

Bus 918 can be any suitable mechanism for communicating between two or more components 902, 904, 906, 910, and 914 in some embodiments.

Any other suitable components can be included in hardware 900 in accordance with some embodiments.

In some embodiments, at least some of the above described blocks of the processes of FIGS. 1-7 can be executed or performed in any order or sequence not limited to the order and sequence shown in and described in connection with the figures. Also, some of the above blocks of FIGS. 1-7 can be executed or performed substantially simultaneously where appropriate or in parallel to reduce latency and processing times. Additionally or alternatively, some of the above described blocks of the processes of FIGS. 1-7 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, identity systems, methods, and media for auditing and notifying users concerning verifiable claims are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for identity escrow, the method comprising:

receiving, using a hardware processor, a request to store the information associated with a holder in escrow;

causing, using the hardware processor, a user interface to be presented, wherein the user interface allows the holder to select an escrow provider from a plurality of escrow providers for storing the information associated with the holder in escrow, wherein the escrow providers are providers who have been vetted by an escrow authority to hold data in escrow on behalf of the holder;

transmitting, using the hardware processor, the information to the selected escrow provider, wherein a public-private key pair for signing with the information associated with the holder is generated, wherein the public-private key pair includes a public key and a private key, wherein the private key and the information associated with the holder is distributed to the plurality of escrow providers, and wherein the public key is transmitted to an auditable ledger system;

receiving, using the hardware processor, a request to access a service from a verifier; and transmitting, in response to the request to access, the private key and the information associated with the holder from at least one of the plurality of escrow providers to the verifier.

2. The method of claim 1, wherein the request to store the information associated with the holder in escrow is received prior to engaging with a verifier needing information held in escrow on behalf of the holder.

3. The method of claim 1, further comprising:

receiving, from each of the plurality of escrow providers, an escrow identifier corresponding to a location where the information is stored in escrow to obtain a set of escrow identifiers; and transmitting the set of escrow identifiers to a verifier device for verifying a claim.

4. The method of claim 3, further comprising transmitting a request to access a service in which the verifier at the verifier device is accessing the information associated with the holder in escrow using the set of escrow identifiers.

5. The method of claim 3, wherein the escrow identifier is received from an escrow provider in response to the escrow provider verifying the received information and wherein metadata indicating one or more fields in which the information is stored is received from the escrow provider.

6. The method of claim 3, wherein signed metadata and escrow key information associated with the escrow identifier are transmitted to the verifier device.

7. The method of claim 6, wherein the escrow key information includes a generation date and an expiration date.

8. The method of claim 1, further comprising transmitting a query to the auditable ledger system to determine whether the set of escrow identifiers have been posted to a ledger of the auditable ledger system.

9. The method of claim 8, further comprising receiving an alert that the verifier is accessing the information associated with the holder that is being held in escrow based on the transmitted query.

10. The method of claim 1, wherein the information associated with the holder is received from an identity application executing on a computing device associated with the holder and wherein the identity application causes the user interface to be presented.

11. A system for identity escrow, the system comprising:
a hardware processor that is configured to:
receive a request to store the information associated with the holder in escrow;
cause a user interface to be presented, wherein the user interface allows the holder to select an escrow provider from a plurality of escrow providers for storing the information associated with the holder in escrow, wherein the escrow providers are providers who have been vetted by an escrow authority to hold data in escrow on behalf of the holder;
transmit the information to the selected escrow provider, wherein a public-private key pair for signing with the information associated with the holder is generated, wherein the public-private key pair includes a public key and a private key, wherein the private key and the information associated with the holder is distributed to the plurality of escrow providers, and wherein the public key is transmitted to an auditable ledger system;
receiving, using the hardware processor, a request to access a service from a verifier; and
transmitting, in response to the request to access, the private key and the information associated with the holder from at least one of the plurality of escrow providers to the verifier.

12. The system of claim 11, wherein the request to store the information associated with the holder in escrow is received prior to engaging with a verifier needing information held in escrow on behalf of the holder.

13. The system of claim 11, wherein the hardware processor is further configured to:
receive, from each of the plurality of escrow providers, an escrow identifier corresponding to a location where the information is stored in escrow to obtain a set of escrow identifiers; and
transmit the set of escrow identifiers to a verifier device for verifying a claim.

14. The system of claim 13, wherein the hardware processor is further configured to transmit a request to access a service in which the verifier at the verifier device is accessing the information associated with the holder in escrow using the set of escrow identifiers.

15. The system of claim 13, wherein the escrow identifier is received from an escrow provider in response to the escrow provider verifying the received information and wherein metadata indicating one or more fields in which the information is stored is received from the escrow provider.

16. The system of claim 13, wherein signed metadata and escrow key information associated with the escrow identifier are transmitted to the verifier device.

17. The system of claim 16, wherein the escrow key information includes a generation date and an expiration date.

18. The system of claim 11, wherein the hardware processor is further configured to transmit a query to the auditable ledger system to determine whether the set of escrow identifiers have been posted to a ledger of the auditable ledger system.

19. The system of claim 18, wherein the hardware processor is further configured to receive an alert that the verifier is accessing the information associated with the holder that is being held in escrow based on the transmitted query.

20. The system of claim 11, wherein the information associated with the holder is received from an identity application executing on a computing device associated with the holder and wherein the identity application causes the user interface to be presented.

21. A non-transitory computer-readable medium containing computer executable instructions that, when executed by a processor, cause the processor to perform a method for identity escrow, the method comprising:
receiving a request to store the information associated with the holder in escrow;
causing a user interface to be presented, wherein the user interface allows the holder to select an escrow provider from a plurality of escrow providers for storing the information associated with the holder in escrow, wherein the escrow providers are providers who have been vetted by an escrow authority to hold data in escrow on behalf of the holder;
transmitting the information to the selected escrow provider, wherein a public-private key pair for signing with the information associated with the holder is generated, wherein the public-private key pair includes a public key and a private key, wherein the private key and the information associated with the holder is distributed to the plurality of escrow providers, and wherein the public key is transmitted to an auditable ledger system;
receiving, using the hardware processor, a request to access a service from a verifier; and
transmitting, in response to the request to access, the private key and the information associated with the holder from at least one of the plurality of escrow providers to the verifier.

* * * * *